United States Patent Office 3,274,276
Patented Sept. 20, 1966

3,274,276
PREPARATION OF CYCLOALKYL AROMATIC COMPOUNDS
James J. Louvar, Riverside, Ill., assignor to Universal Oil Products Company, Des Plaines, Ill., a corporation of Delaware
No Drawing. Filed May 29, 1963, Ser. No. 284,015
9 Claims. (Cl. 260—668)

This invention relates to a process for the preparation of cycloalkyl aromatic compounds and particularly to a process whereby an aromatic compound is subjected to a combination alkylation-hydrogenation reaction to produce the desired product.

It has now been discovered that aromatic compounds and particularly aromatic hydrocarbons may be treated with hydrogen in the presence of an alkylation-hydrogenation catalyst at reaction conditions hereinafter set forth in greater detail to prepare cycloalkyl aromatic hydrocarbons. These cycloalkyl aromatic hydrocarbons will find a wide variety of uses in the chemical field. For example, phenylcyclohexane which is obtained by treating benzene with hydrogen in the presence of an alkylation-hydrogenation catalyst is an important chemical intermediate. By subjecting this chemical to oxidation it is possible to obtain phenol and cyclohexanone which are important intermediates for the preparation of plastics, resins, and synthetic fibers. It is to be noted that when treating the aromatic compound according to the process of this invention that the desired product will be a non-condensed cycloalkyl aromatic compound. The term "aromatic compound" as used in the present specification and appended claims will refer to mono- and polycyclic aromatic compounds which may contain ring substituents, said substituents including alkyl, alkoxy and acyl radicals.

It is therefore an object of this invention to provide a novel process for preparing non-condensed cycloalkyl aromatic compounds.

A further object of this invention is to provide a process for treating aromatic hydrocarbons with hydrogen in the presence of an alkylation-hydrogenation catalyst to prepare the desired non-condensed cycloalkyl aromatic compounds.

Taken in its broadest aspect one embodiment of this invention resides in a process for the preparation of a non-condensed cycloalkyl aromatic compound which comprises treating an aromatic compound with hydrogen in the presence of an alkylation-hydrogenation catalyst at reaction conditions, and recovering the desired cycloalkyl aromatic compound.

A further embodiment of this invention is found in a process for the preparation of a non-condensed cycloalkyl aromatic compound which comprises treating an aromatic compound with hydrogen in the presence of an alkylation-hydrogenation catalyst comprising aluminum bromide and platinum composited on charcoal at a temperature in the range of from about 25° to about 300° C. and at a pressure in the range of from about 2 to about 100 atmospheres, and recovering the desired cycloalkyl aromatic compound.

A specific embodiment of this invention resides in a process for the preparation of a non-condensed cycloalkyl aromatic compound which comprises treating benzene with hydrogen in the presence of an alkylation-hydrogenation catalyst comprising aluminum chloride and palladium composited on charcoal at a temperature in the range of from about 25° to about 50° C. and at a pressure in the range of from about 50 to about 100 atmospheres, and recovering the desired phenylcyclohexane.

Other objects and embodiments will be found in the following further detailed description of this invention.

As hereinbefore set forth, it has now been discovered that aromatic compounds may be treated with hydrogen in the presence of an alkylation-hydrogenation catalyst whereby a combination hydrogenation and alkylation reaction is effected, thereby forming a non-condensed cycloalkyl aromatic compound. Examples of aromatic compounds which may be utilized as starting materials in the process of this invention possess the generic formulae:

and

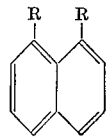

in which R is selected from the group consisting of hydrogen, alkyl, alkoxy or acyl radicals. Examples of aromatic compounds which may be used include benzene, toluene, ethylbenzene, n-propylbenzene, isopropylbenzene, anisole (methylphenyl ether), ethylphenyl ether, propylphenyl ether, naphthalene, methylnaphthalene, ethylnaphthalene, propylnaphthalene, methylnaphthyl ether, ethylnaphthyl ether, etc. It is also contemplated within the scope of this invention that the charge stock may comprise a mixture of aromatic compounds such as a benzene-toluene mixture, a benzene-anisole mixture, etc.

The reaction is effected at temperatures ranging from about room temperature (25° C.) up to about 300° C. or more, and at pressures ranging from about 2 to about 100 atmospheres (29 to 1500 pounds per square inch) or more. The pressure utilized will depend upon the reactants undergoing hydroalkylation and upon the particular temperatures used, the amount of pressure being that which is sufficient to maintain a major portion of the reactants in the liquid phase. While it is contemplated that a portion of the pressure will be provided by the hydrogen for the hydrogenatioin portion of the reaction, the remainder may, if necessary, be supplied by an inert gas such as nitrogen. The hydrogenation portion of the catalysts which may be used in this process include those well known in the art such as the Group VIII metals of the Periodic Table, their oxides, sulfides, etc. either utilized per se or on a solid support, said catalysts including nickel, nickel composited on charcoal, nickel composited on alumina, nickel composited on silica, nickel sulfide, platinum, platinum composited on charcoal, platinum composited on alumina, platinum composited on silica, platinum oxide, palladium, palladium composited on charcoal, palladium composited on alumina, palladium composited on silica, palladium oxide, palladium sulfide, etc. The alkylation portion of the catalysts which may be used include mineral acids such as sulfuric acid, phosphoric acid, et.; Friedel-Crafts metal halides such as aluminum chloride, aluminum bromide, ferric chloride, zinc chloride, stannic chloride, etc.; boron trifluoride, silica-alumina, etc. The alkylation portion of the combination alkylation-hydrogenation catalyst should be the dominant portion, that is, a strong or relatively strong alkylation catalyst should be used in connection with a weak or relatively weak hydrogenation catalyst. The hydroalkylation will usually be most effective when utilizing pressure and temperature conditions which are favorable for alkylation and sluggish for hydrogenation. A particularly effective alkylation-hydrogenation catalyst comprises aluminum bromide and palladium supported on charcoal.

When using dissimilar aromatic compounds as starting materials in the process of this invention, it is possible to obtain specific compounds as the desired product. For example, improved results may be obtained by hydrogenating a mixture of aromatic hydrocarbons, one of which will hydrogenate faster than the other. When this system is used, the aromatic hydrocarbon which hydrogenates faster will alkylate the less active compound. For example, when utilizing a mixture of benzene and toluene the desired product will contain a major portion of cyclohexyltoluene. In addition, it is also possible to hydrogenate a mixture in which one of the aromatic compounds hydrogenates at a lower rate but has a high alkylation potential. For example, when using benzene and anisole as the starting material, the product will contain a major portion of cyclohexylanisole.

The process of this invention may be effected in any suitable manner and may comprise either a batch or continuous type operation. When a batch type operation is used, the desired catalyst comprising the alkylation-hydrogenation catalyst are placed in an appropriate apparatus. The aromatic compound or a mixture of aromatic compounds are placed in the apparatus which is thereafter sealed. Hydrogen is pressed in, following which the apparatus is heated until a noticeable change in pressure occurs, following which the apparatus is maintained at that temperature for a predetermined period of time. Following this the apparatus is allowed to cool to room temperature, the excess pressure is vented and the reaction product is recovered and filtered to remove the catalyst. The reaction product is then subjected to conventional separation means such as fractional distillation, crystallization, etc. whereby the desired product is separated from unreacted starting materials and recovered.

It is also contemplated within the scope of this invention that the process herein may be effected in a continuous type manner. When such an operation is used, the starting material comprising an aromatic compound or a mixture of aromatic compounds is continuously charged to a reaction zone which is maintained at the proper operating conditions of temperature and pressure. This reaction zone contains the predetermined alkylation-hydrogenation catalyst. Hydrogen is pressed in and after a predetermined residence time, the reactor effluent is continuously withdrawn and purified whereby the desired product comprising the non-condensed cycloalkyl aromatic compound is separated from unreacted starting materials which may be recycled to form a portion of the feed stock. When utilizing solid alkylation-hydrogenation catalysts, a particularly effective type of operation comprises the fixed bed type in which the aromatic compound is passed in either an upward or downward flow over a fixed bed of the catalyst. Other types of operations would include the compact moving bed type of operation in which the catalyst and the reactants pass either concurrently or countercurrently to each other and the slurry type of operation in which the catalyst is carried into the reaction zone as a slurry in the reactants.

Examples of cycloalkyl aromatic compounds, non-condensed in nature, which may be prepared according to the process of this invention include phenylcyclohexane, phenylmethylcyclohexane, cyclohexyltoluene, cyclohexylanisole, methoxycyclohexylanisole, phenylmethoxycyclohexane, etc.

The following examples are given to illustrate the process of the present invention which, however, are not intended to limit the generally broad scope of the present invention in strict accordance therewith.

*Example I*

In this example 50 cc. of benzene were placed in a Parr hydrogenation apparatus along with 2 grams of an alkylation-hydrogenation catalyst comprising aluminum chloride and palladium composited on charcoal. Hydrogen was pressed in until a pressure of 60 pounds per square inch gauge was reached. The apparatus and contents thereof were heated to a temperature in the range of from about 30° to about 35° C. and maintained thereat for a period of about 24 hours. At the end of this time the apparatus and contents thereof were cooled to room temperature, the excess pressure was vented and the reaction product filtered to remove the catalyst. The aforementioned reaction product was analyzed on a gas-liquid chromatograph and found to contain phenylcyclohexane.

*Example II*

In this example 50 cc. of benzene along with 3 grams of aluminum chloride and platinum oxide was treated in a manner similar to that set forth in Example I above, that is, by placing the reactant and catalyst in a Parr hydrogenation apparatus, pressing hydrogen in until a pressure of 60 pounds per square inch gauge was reached and thereafter heating the apparatus to a temperature of from between 30° and 35° C. At the end of 6 hours, the apparatus and contents thereof were cooled to room temperature, the excess pressure vented and the reaction product filtered to remove the catalyst. The reaction product was then analyzed by means of a gas-liquid chromatograph and found to contain phenylcyclohexane.

*Example III*

In this experiment 37 grams of toluene and 16 grams of benzene along with 2 grams of an alkylation-hydrogenation catalyst comprising palladium composited on charcoal and aluminum chloride were placed in a hydrogenation apparatus. The apparatus was sealed and hydrogen pressed in until an initial pressure of 60 pounds per square inch gauge has been reached. The apparatus and contents thereof were then heated to a temperature in the range of from about 30° to about 35° C. and maintained thereat for a period of about 24 hours. At the end of this time the apparatus and contents thereof were allowed to cool to room temperature, the excess pressure was vented and the reaction product filtered to remove the catalyst. Upon analysis of the product on a gas-liquid chromatograph, the product was found to contain phenylmethylcyclohexane and cyclohexyltoluene.

*Example IV*

In this example 10.8 grams of anisole and 16.0 grams of benzene were placed in a hydrogenation apparatus along with 2 grams of an alkylation-hydrogenation catalyst comprising palladium composited on charcoal and aluminum chloride. Hydrogen was pressed in until an initial pressure of 60 pounds per square inch gauge had been reached. The apparatus and contents thereof were then heated to a temperature of between 50° and 55° C. and maintained thereat for a period of about 32 hours. At the end of this time the apparatus and contents thereof were allowed to cool to room temperature, the excess pressure was vented and the flask opened. The reaction product was filtered to remove the catalyst and subjected to analysis on a gas-liquid chromatograph. The product was found to contain a mixture of cyclohexylanisole, methoxycyclohexylanisole, phenylcyclohexane and phenylmethoxycyclohexane.

*Example V*

In this experiment 26.5 grams of xylene and 15.3 grams of toluene were placed in a hydrogenation apparatus along with 2 grams of an alkylation-hydrogenation catalyst comprising palladium composited on charcoal and aluminum chloride. Hydrogen was then pressed in until an initial pressure of 60 pounds per square inch gauge had been reached. Following this the aparatus and contents thereof were heated to a temperature of about 50° C. and maintained thereat for a period of 6 hours. At the end of this time the apparatus and contents thereof were allowed to cool to room temperature, the excess pressure was vented and the flask opened. The reaction product was then filtered to remove the catalyst, subjected to analysis on a gas-liquid chromatograph and the product was found to contain a mixture of methylcyclohexylxylenes.

I claim as my invention:

1. A process for the preparation of a non-condensed cycloalkyl aromatic compound which comprises treating an aromatic compound with hydrogen in the presence of an alkylation-hydrogenation catalyst comprising aluminum chloride and platinum or palladium at a temperature of from about 25° C. to about 50° C., and recovering the resultant cycloakyl aromatic compound.

2. A process for the preparation of a non-condensed cycloalkyl aromatic compound as set forth in claim 1, in which said alkylation-hydrogenation catalyst comprises aluminum chloride and palladium composited on charcoal.

3. A process for the preparation of a non-condensed cycloalkyl aromatic compound as set forth in claim 1, in which said alkylation-hydrogenation catalyst comprises aluminum chloride and platinum composited on charcoal.

4. A process for the preparation of a non-condensed cycloalkyl aromatic compound as set forth in claim 1, in which said alkylation-hydrogenation catalyst comprises aluminum chloride and platinum oxide.

5. A process for the preparation of a non-condensed cycloalkyl aromatic compound as set forth in claim 1, in which said aromatic compound comprises benzene.

6. A process for the preparation of a non-condensed cycloalkyl aromatic compound as set forth in claim 1, in which said aromatic compound comprises toluene.

7. A process for the preparation of a non-condensed cycloalkyl aromatic compound as set forth in claim 1, in which said aromatic compound comprises ethylbenzene.

8. A process for the preparation of a non-condensed cycloalkyl aromatic compound which comprises treating benzene with hydrogen in the presence of an alkylation-hydrogenation catalyst comprising aluminum chloride and palladium composited on charcoal at a temperature in the range of from about 25° to about 50° C. and at a pressure in the range of from about 50 to about 100 atmospheres, and recovering the desired phenylcyclohexane.

9. A process for the preparation of a non-condensed cycloalkyl aromatic compound which comprises treating benzene and toluene with hydrogen in the presence of an alkylation-hydrogenation catalyst comprising aluminum chloride and palladium composited on charcoal at a temperature in the range of from about 25° to about 50° C. and at a pressure in the range of from about 50 to about 100 atmospheres, and recovering the desired phenylmethylcyclohexane and cyclohexyltoluene.

References Cited by the Examiner
UNITED STATES PATENTS

| | | | |
|---|---|---|---|
| 2,927,085 | 3/1960 | Gordon et al. | 260—671 |
| 3,153,678 | 10/1964 | Logemann | 260—667 |

DELBERT E. GANTZ, *Primary Examiner.*

C. R. DAVIS, *Assistant Examiner.*